(12) United States Patent
Bovero et al.

(10) Patent No.: US 12,001,899 B2
(45) Date of Patent: Jun. 4, 2024

(54) BINARY PUNCH MARKER, AND A SYSTEM AND METHOD FOR FABRICATING THE SAME

(71) Applicant: Saudi Arabian Oil Company, Dhahran (SA)

(72) Inventors: Enrico Bovero, Vancouver (CA); Dana Abdullatif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 271 days.

(21) Appl. No.: 17/304,667

(22) Filed: Jun. 24, 2021

(65) Prior Publication Data

US 2022/0414405 A1    Dec. 29, 2022

(51) Int. Cl.
*G06K 13/02*      (2006.01)
*G05B 19/4155*    (2006.01)

(52) U.S. Cl.
CPC ......... *G06K 13/02* (2013.01); *G05B 19/4155* (2013.01); *G05B 2219/33099* (2013.01)

(58) Field of Classification Search
CPC ............. G06K 13/02; G06K 19/06159; G05B 19/4155; G05B 2219/33099; G05B 2219/45137; G05B 2219/49327; G05B 19/4093
See application file for complete search history.

(56) References Cited

U.S. PATENT DOCUMENTS

| | | | |
|---|---|---|---|
| 4,053,433 A | 10/1977 | Lee | |
| 5,491,637 A | 2/1996 | Kraemer et al. | |
| 10,386,175 B2 * | 8/2019 | Lacome | ............... G01B 11/00 |
| 11,448,342 B2 * | 9/2022 | Ducceschi | ......... B23K 37/0276 |
| 2003/0019566 A1 | 1/2003 | Pate et al. | |
| 2005/0006481 A1 | 1/2005 | Han et al. | |
| 2011/0042452 A1 * | 2/2011 | Cormack | ............... G06Q 10/08 |
| | | | 235/375 |
| 2014/0326507 A1 | 11/2014 | Spriggs | |
| 2019/0093828 A1 | 3/2019 | Bovero et al. | |

FOREIGN PATENT DOCUMENTS

| | | |
|---|---|---|
| WO | 1994002857 A1 | 2/1994 |
| WO | 0034937 A1 | 6/2000 |

OTHER PUBLICATIONS

Goodney, Andrew, "Lecture 1: Introduction to Computer Science." CSCI 109, Aug. 26, 2019. 52 pages.

* cited by examiner

*Primary Examiner* — Seung H Lee
(74) *Attorney, Agent, or Firm* — Leason Ellis LLP

(57) ABSTRACT

A binary punch marker identifies pipes and welds at joints of pipes, and a system and method fabricate such a binary punch marker. The binary punch marker has information encoded by recesses in the marker for identifying the pipes and welds. The information is encrypted to prevent forgery of metallic assets such as pipes, pipelines, storage tanks, etc. during inspection of the metallic assets.

11 Claims, 4 Drawing Sheets

BINARY PUNCH MARKER, AND A SYSTEM AND METHOD FOR FABRICATING THE SAME

FIELD OF THE DISCLOSURE

The present disclosure relates generally to identifying markers, and, more particularly, to binary punch markers for identifying pipes and welds, and a system and method for fabricating such binary punch markers.

BACKGROUND OF THE DISCLOSURE

Binary information has been encoded in recesses on cards for over a century. One notable example is a card with recesses such as holes, which are used in Jacquard looms. A Jacquard loom utilizes such recesses to control the threading of fabric. The card in a Jacquard loom can be composed of metal for durability, and so such cards can be radiopaque by virtue of being metallic.

Other radiopaque devices are known which serve as identifying markers, with the identification information visible using radiographic techniques such as by the application of X-rays. Such markers are typically rectangular, but other shapes have been used, such as circular shapes and polygonal shapes. The markers can be used to identify seams of a weld of a joint joining pipes together. The markers can be mounted near the weld joint or seam using adhesive.

SUMMARY OF THE DISCLOSURE

According to an embodiment consistent with the present disclosure, a binary punch marker identifies pipes and welds at joints of pipes, and a system and method are provided for fabricating such a binary punch marker. The binary punch marker has information encoded by recesses in the marker for identifying the pipes and welds. The information is encrypted to prevent forgery of metallic assets such as pipes, pipelines, storage tanks, etc. during inspection of the metallic assets.

In an embodiment, a marker of the present disclosure has identifying information which identifies an object. The marker comprises a substrate composed of a radiopaque material and having a bottom surface configured to be placed adjacent to the object, as well as a top surface with a plurality of recesses in at least the top surface. The plurality of recesses are configured to encode the identifying information using a predetermined pattern. The radiopaque material can be composed of lead. The substrate can have a rectangular shape with the plurality of recesses arrayed in a rectangular grid. The plurality of recesses can be holes which pass through the top and bottom surfaces. The marker can also include a fastener coupled to the bottom surface and configured to fasten the marker to the object.

In another embodiment, a system of the present disclosure comprises a fabrication machine and a controller. The fabrication machine is configured to fabricate a marker having identifying information identifying an object. The marker includes a substrate composed of a radiopaque material and having a bottom surface configured to be placed adjacent to the object, and having a top surface. The controller has a processor operating a predetermined encoding process, with the processor configured to control the machine to fabricate the marker with a plurality of recesses in at least the top surface. The plurality of recesses encode the identifying information. The fabrication machine can be a computer numerical control (CNC) machine. The fabrication machine can include a drill for drilling the plurality of recesses in the substrate. Alternatively, the fabrication machine can include a boring tool for boring the plurality of recesses in the substrate.

In a further embodiment, a method of the present disclosure comprises receiving an alphanumeric identifier of an object, generating a unique binary identifier from the alphanumeric identifier, and controlling a fabrication machine configured to fabricate a marker which encodes the binary identifier within a pattern defined by a plurality of recesses. The object can be a weld joint of a pipe. The fabrication machine can be a computer numerical control (CNC) machine. The marker includes a substrate composed of a radiopaque material and having a bottom surface configured to be placed adjacent to the object, and having a top surface. In performing the method, the controlling of the fabrication machine includes fabricating the marker with a plurality of recesses in at least the top surface, with the plurality of recesses configured in the pattern to encode the alphanumeric identifier using the unique binary identifier. In performing the method, the generating of the unique binary identifier includes converting any ASCII letters of the alphanumeric identifier to a first set of binary numbers, converting any numbers of the alphanumeric identifier to a second set of binary numbers, and concatenating the first and second sets to generate a binary string. After generating the binary string, the generating of the unique binary identifier further includes obfuscating the binary string, which can be performed by applying a hash function to the binary string. In performing the method, the method can further comprise fastening the fabricated marker adjacent to the object, for example, by securing the fabricated marker adjacent to the object using adhesive. The binary identifier identifies the object adjacent to the fabricated marker.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a binary punch marker identifies pipes and welds at joints of pipes, and a system and method for fabricating such a binary punch marker.

Figure 1:
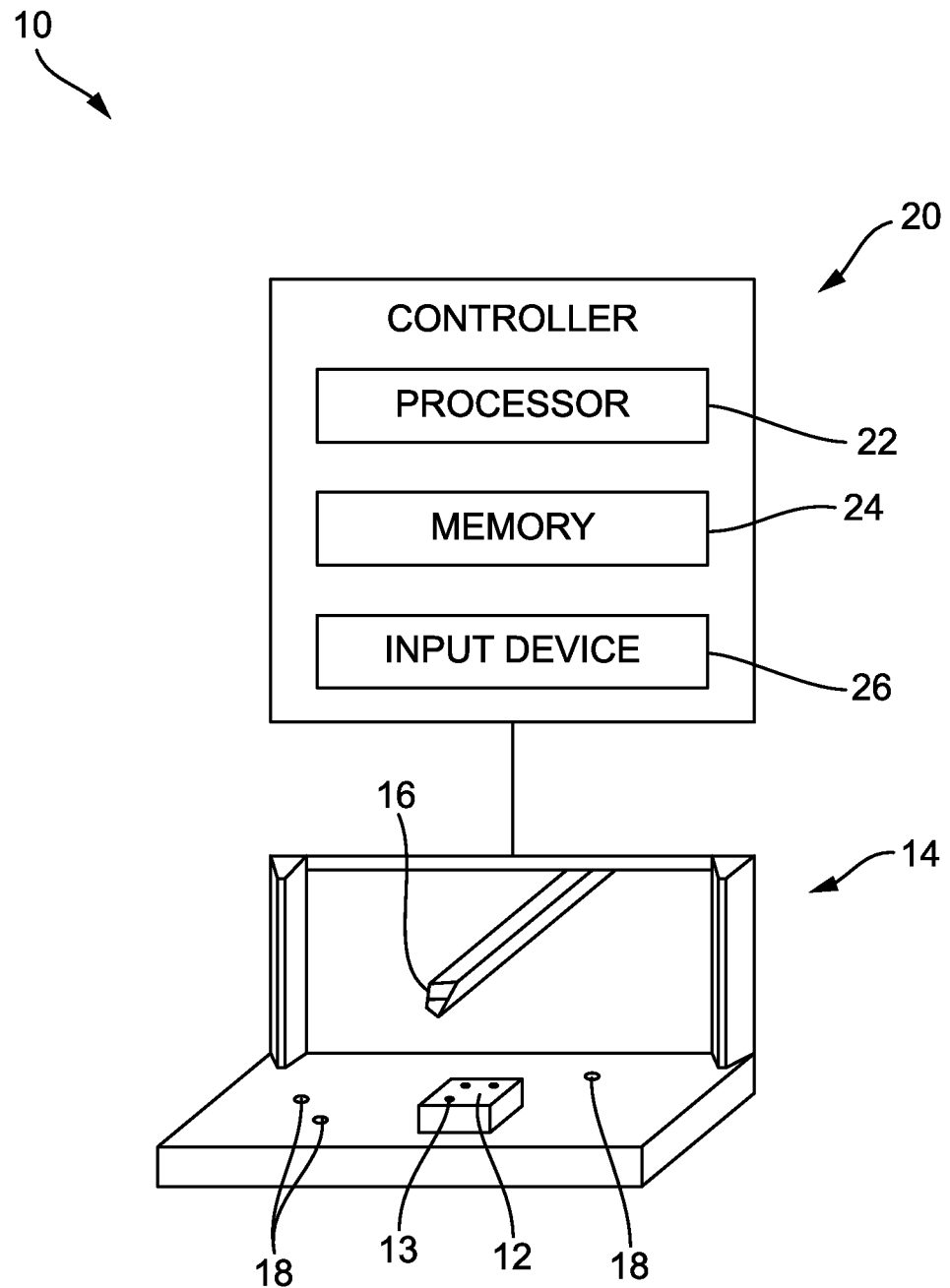
FIG. 1 is a schematic diagram of a fabrication system, according to an embodiment.
Figure 3:
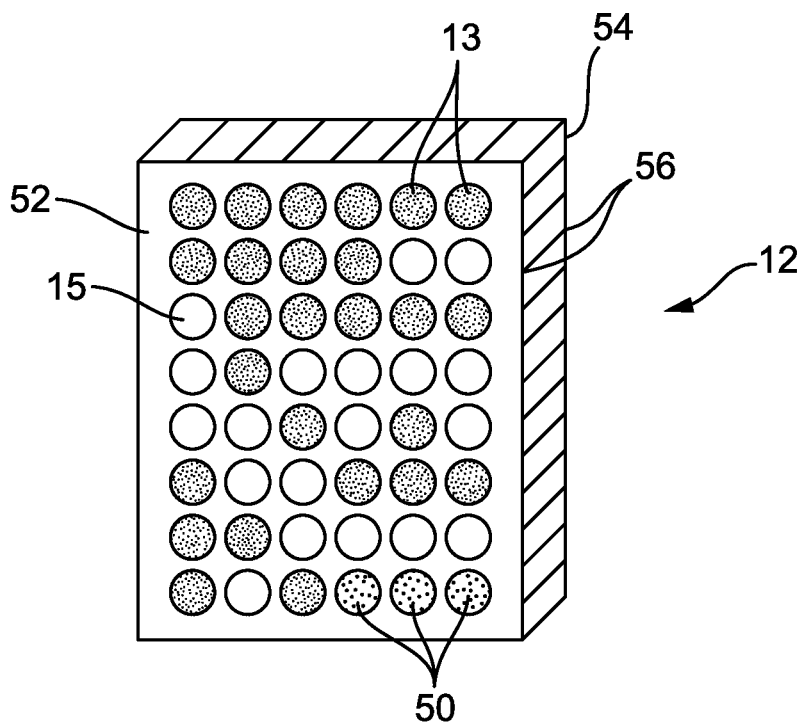
FIG. 3 is a top front side view of a binary punch marker, according to the embodiment.

According to an embodiment shown in FIG. 1, a system 10 fabricates a marker 12 from a raw substrate using a known fabrication method. For example, the system 10 includes a computer numerical control (CNC) machine 14 having a punch mechanism 16 for selectively punching recesses 13 in a substrate of raw material to form the marker 12. The recesses 13 can extend through at least a top surface 52 of the substrate of the marker 12, as shown in FIG. 3. Alternatively, the recesses 13 are holes which extend through both the top surface 52 and a bottom surface 54. The punch mechanism 16 can generates a chad 18 of material from the raw substrate. The substrate is composed of a radiopaque material, including metal such as lead. Accordingly, the chad 18 is also composed of lead. The chads 18 can be recycled to create new raw substrates for forming new markers 12. By using a radiopaque material, the marker 12 can be used during inspection of pipes and welds at joints employing radiography such as X-rays, since the marker 12 will scatter X-rays.

In an alternate embodiment, the CNC machine 14 includes a drill for drilling the recesses 13 in the marker 12. In another embodiment, the CNC machine 14 includes a boring tool for boring the recesses 13 in the marker 12. The CNC machine 14 is connected to a controller 20 having a processor 22, a memory 24, and an input device 26. Using the input device 26, a user enters a string of alphanumeric symbols representing information identifying an aspect of a pipe, such as a joint of a pipe. As used herein, the term "joint" refers to a joining of two pipe members to create an overall pipe. The string can identify the joint itself. Alternatively, the string can identify one or more of the pipe members forming the joint. Furthermore, the string can identify other metallic assets which are subject to inspection, such as pipelines, storage tanks, etc.

The string is saved in the memory 24. The string is processed by the processor 22 to instruct the controller 10 to automatically control the punch mechanism 16 for selectively punching the recesses 13. The selective punching of recesses 13 form the marker 12. By selectively punching the recesses 13, the system 10 creates the marker 12 with the recesses 13 encoding the identifying information concerning the joint.

Figure 2:
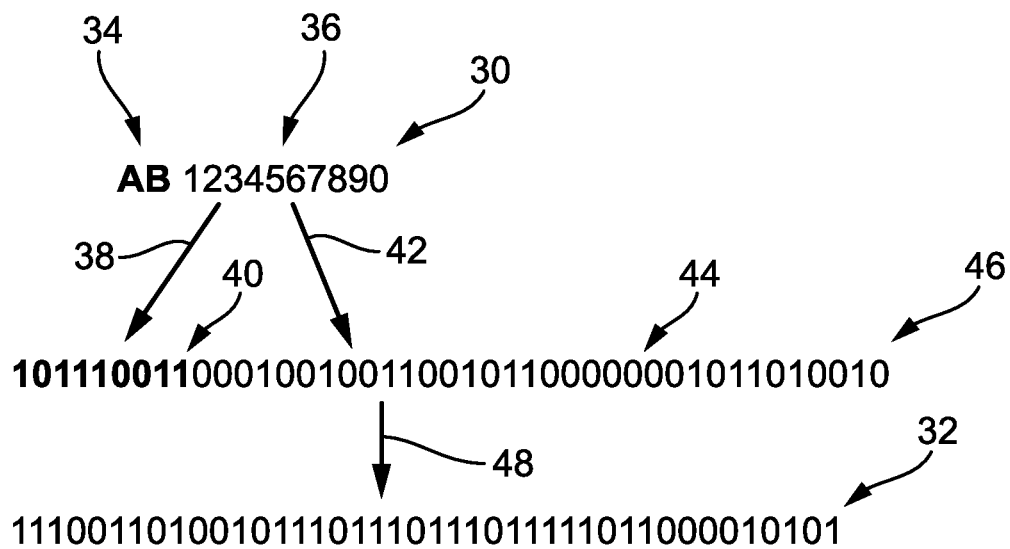
FIG. 2 is a flow diagram of an encoding method, according to the embodiment.

Referring to FIG. 2, the processor 22 performs a conversion procedure to convert the string 30 of alphanumeric symbols into a corresponding binary string 32. The string 30 can include a set 34 of alphabetic symbols, and can include a set 36 of numerical symbols. It is to be understood that one of the sets 34, 36 can be omitted, such that the string 30 only includes alphabetic symbols, or only includes numerical symbols. For example, the string 30 can have two alphabetic letters and ten numerical digits. Such a string 30 can be converted into a 6×8 array or grid of recesses 13 and non-recesses 15 according to a binary system. It is understood that the recesses 13 and non-recesses 15 can be arranged in any pattern, such as a circular pattern, a triangular pattern, a linear pattern, or any known shape of a pattern of recesses 13 and non-recesses 15.

The alphabetic symbols in the string 34 are in an ASCII format, which can be represented by numbers in a base-36 format. Using a known conversion procedure 38 from base-36 to base-2 (binary) format, the processor 22 generates a set 40 of binary numbers from the set 34 of alphabetic symbols. The numerical symbols in the string 36 are in base-10 format. In addition, using a known conversion procedure 42 from base-10 to base-2 format, the processor 22 generates a set 44 of binary numbers from the set 36 of numerical symbols. In the example of two letters and ten numbers in the string 30, the two letters can be converted to nine binary positions to represent the letters, and the ten digits can be converted to thirty-four binary positions to represent the numbers. Accordingly, the string 30 can be represented by forty-three binary positions in the forty-eight positions in the 6×8 array of recesses 13 and non-recesses 15. The additional positions, such as the positions 50 in FIG. 3, can be used for auxiliary functions as described below. Alternatively, the positions 50 can be used for an additional operation in order to further complicate or obfuscate decryption of the recesses 13. For example, the positions 50 having recesses and non-recesses can represent a first number that, if multiplied or divided by a second number represented by the rest of the positions in the 6×8 array, gives a correct code to be decrypted.

Referring back to FIG. 2, the sets 40, 44 of binary numbers are then concatenated to form a string 46 of binary numbers. The processor 22 can then perform a known obfuscation procedure 48 to generate the final binary string 32. The obfuscation procedure 48 can be a hash function, for example, using a hash table. Alternatively, the obfuscation procedure 48 can be any known encryption process. Thus, the identifying information of the initially input string of alphanumeric symbols is encrypted to prevent forgery of metallic assets such as pipes, pipelines, storage tanks, etc. during inspection of the metallic assets.

The controller 20 then instructs the CNC machine 14 to punch the recesses 13 corresponding to the binary string 32 to form the binary punch marker 12 shown in FIG. 3. During the obfuscation procedure 48, a set of data can be generated for an auxiliary function. Such data can then be punched into the marker 12 as the set of positions 50 corresponding the set of data. For example, the set of data can be a checksum of the binary string 32, with the auxiliary function being a checksum function. Alternatively, the set of data can be error correcting codes of the remainder of the binary string 32, with the auxiliary function being an error correcting function. The set of positions 50 are a subset of the overall positions for non-recesses 15 and recesses 13 punched into the marker 12.

Once fabricated, the binary punch marker 12 can be generally cuboidal in shape with a rectangular cross-section as shown in FIG. 3. It is understood that the marker 12 can have any other shapes. It is also understood that the marker 12 can have any other cross-sections such as circular cross-sections. The recesses 13 can be circular or any shape, such as a polygon. The marker 12 has a thickness 56, as shown in FIG. 3. The thickness 56 can be adjusted to the thickness of the asset, such as the underlying pipe to which the marker 12 is attached. The adjustment of the thickness 56 can provide sufficient contrast of the recesses 13 relative to the asset. For example, the thickness 56 can be less than 1 mm and having sufficient contrast, such as shown in the radiograph 70 in FIG. 5. Such a thickness 56 has recesses 13 with sufficient contrast even with the marker 12 placed on top of several centimeters of steel forming the pipe 60 or other asset.

Figure 4:
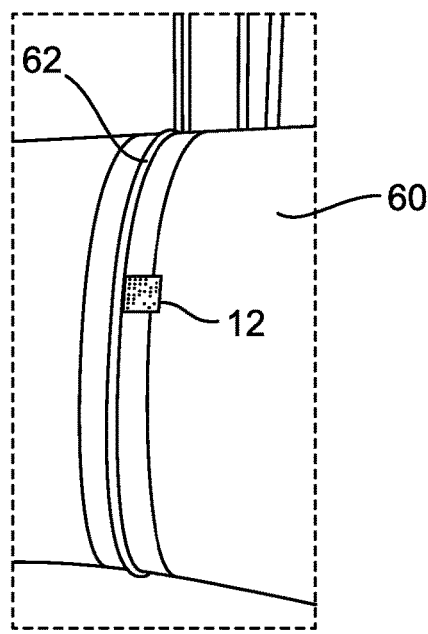
FIG. 4 illustrates an attaching of the binary punch marker adjacent to a weld joint of a pipe.
Figure 5:
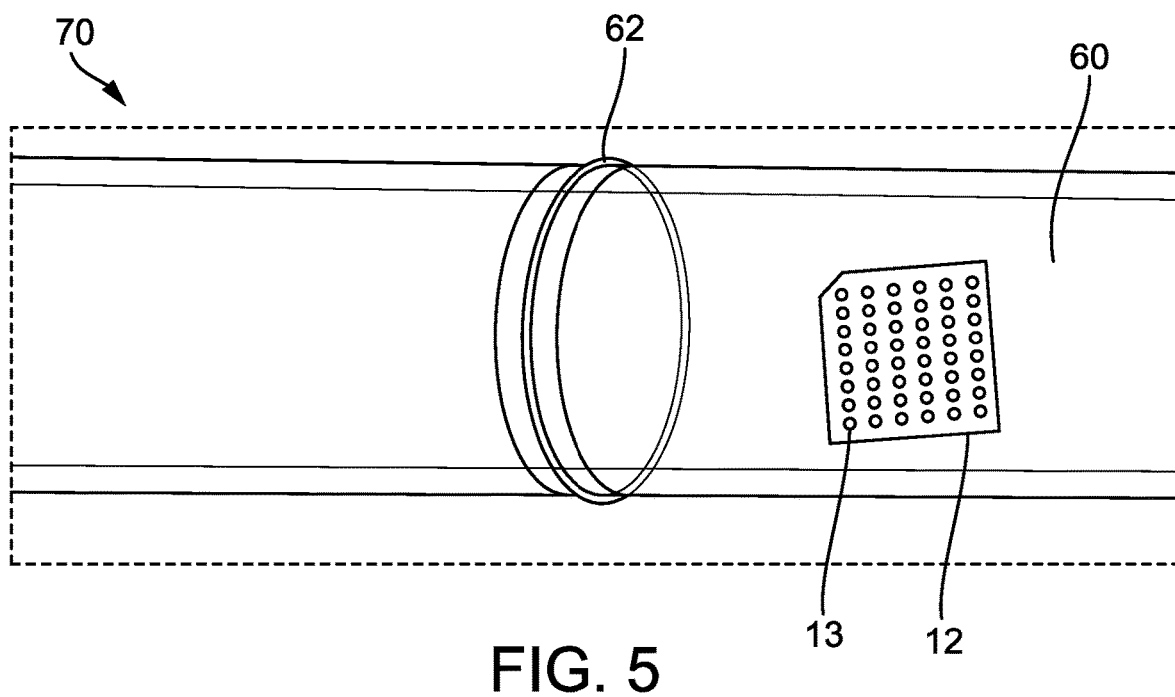
FIG. 5 illustrates a radiograph of the binary punch marker on the pipe.
Figure 6:
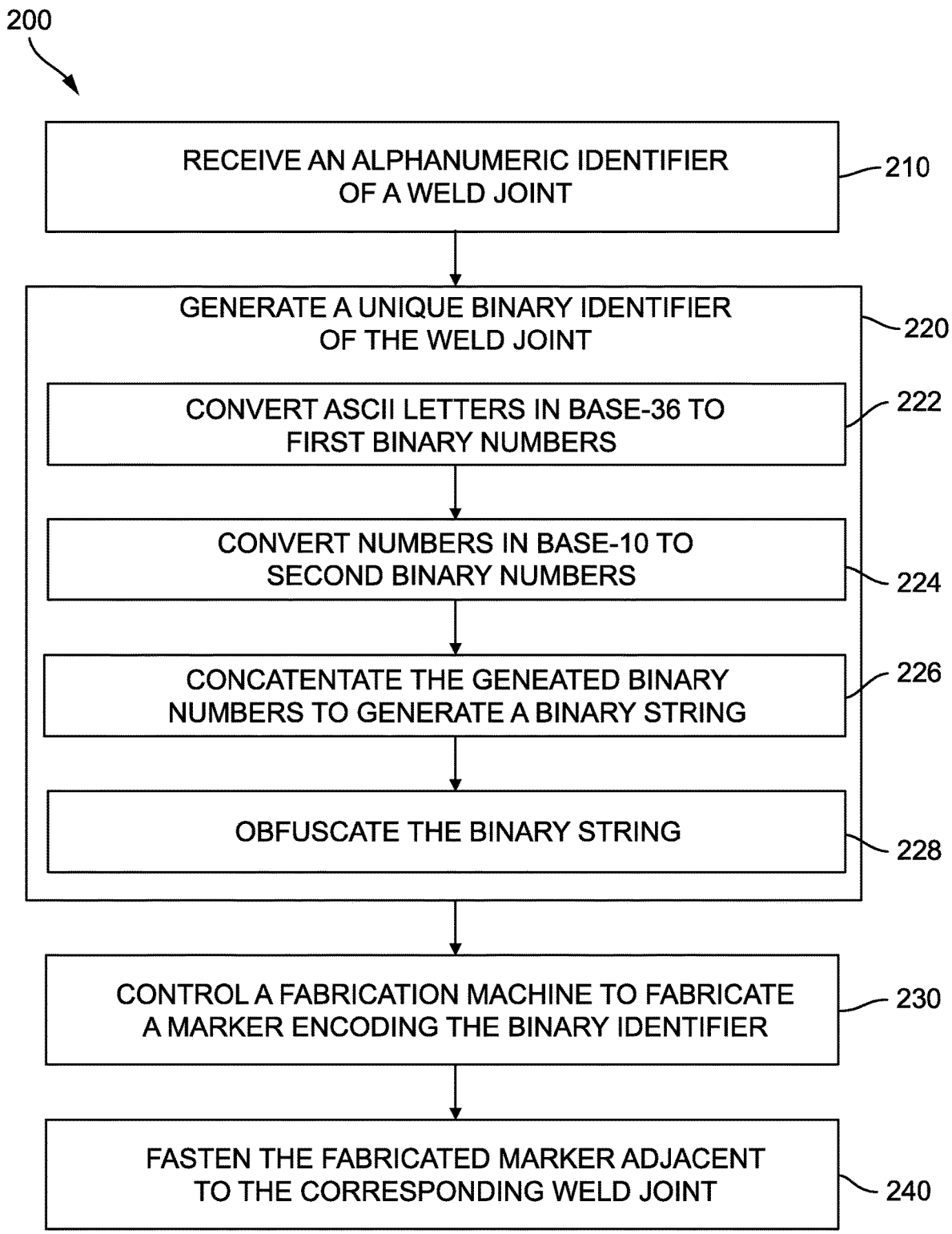
FIG. 6 is a flowchart of a fabrication method, according to the embodiment.

The binary punch marker 12 can then be attached to the pipe 60 adjacent to a weld joint 62 of the pipe 60, as shown in FIG. 4. The binary punch marker 12 has such recesses 13 encode the information identifying the weld joint 62. By being composed of a radiopaque material, such as lead, the binary punch marker 12 can be viewed in a radiograph 70 of the pipe 60, as shown in FIG. 5. For example, the radiograph 70 can be an X-ray image produced by applying X-rays to the pipe 60. Such a radiograph 70 can assist in the viewing of the binary punch marker 12 and its recesses 13. For example, the recesses 13 can fill with dirt, plants, or other debris due to the environmental conditions of the pipe 60. Accordingly, such debris can hamper or prevent a visual inspection of the binary punch marker 12 and its recesses 13. However, a radiographic inspection is not hampered by such debris, and so the identification information of the weld joint 62 can be obtained from the adjacent marker 12.

According to the embodiment, a method 200 of fabricating the marker 12 can include the step 210 of receiving an alphanumeric identifier of a weld joint 62. For example, a user of the system 10 can use the input device 26 of the controller 20 to manually input the alphanumeric identifier 30 to be associated with the weld joint 62. The alphanumeric identifier 30 can specify the location of the weld joint 62 such as the latitude and longitude of the weld joint 62. Alternatively, the alphanumeric identifier 30 can be a unique identifier stored in a database. For example, the alphanumeric identifier 30 can be AB1234567890 as shown in FIG. 2.

The method 200 also includes the step 220 of generating a unique binary identifier of the weld joint 62. The step 220 includes the step 222 of converting any ASCII letters in base-36 to a first set 40 of binary numbers. The step 220 also includes the step 224 of converting any numbers in base-10 to a second set 44 of binary numbers. The step 220 further includes the step 226 of concatenating the generated binary numbers 40, 44 to generate a binary string 46. The step 220 then includes the step 228 of obfuscating the binary string 46 using an obfuscating procedure 48. The method further includes the step 230 of controlling a fabrication machine 14 to fabricate the marker 12 encoding the binary identifier in step 230. The fabricating can be performed under the control of a CNC machine controlling a punch mechanism 16. Alternatively, the fabrication machine 14 can use a drill to drill the recesses 13, or a boring tool to bore the recesses 13.

The method 200 can also include the step 240 of fastening the fabricated marker 12 adjacent to the corresponding weld joint 62. The fastening can include using an adhesive to secure the marker 12 to the pipe 60. Alternatively, the fastening can include welding the marker 12 to the pipe 60. Furthermore, the fastening can including bolting the marker 12 to the pipe 60.

Portions of the methods described herein can be performed by software or firmware in machine readable form on a tangible (e.g., non-transitory) storage medium. For example, the software or firmware can be in the form of a computer program including computer program code adapted to cause the fabrication system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be understood that various parameters such as the size of the marker 12, the number of recesses 13, an aspect ratio of the rectangular pattern, the type of alphanumeric marker, the number of additional positions 50, etc. can be adjusted by the user according to specific applications and needs. Such parameters cause decryption of the binary punch marker 12 to be extremely difficult. The difficulty of decryption increases the reliability of identification of assets such as pipes and welds at pipe joints, and so decreases the possibility of forgery.

It is also to be understood that the system and method of the present disclosure can also be useful in identification procedures that do not require radiography, but instead utilize normal imaging. The marker 12 can then be visible even to the naked eye, and the image of the recesses 13 can be captured using a regular camera or any other type of imaging techniques, such as infrared sensors, reflectance measurements, absorption measurements, fluorescence, thermography, etc. The material and characteristic of the marker 12 can thus be adapted to the specific detection mechanism used. For example, an asset such as a pipe can be recognized from a distance by polishing a portion of its surface and making the asset highly reflective. Unreflective circles can be left on a surface of the asset, representing the equivalent of the recesses 13. This reflexive surface could be read by shining light onto the surface, and capturing an image of its reflection, so that the pattern of non-reflective spots becomes apparent. In another embodiment of the present disclosure, a marker 12 can be generated out of a fluorescent material. Upon shining a light on such a marker 12, the material would fluoresce, creating greater contrast between the marker 12 and the recesses 13. This would enable easier and more accurate pattern detection and identification. Another possible application would be to drill a series of small recesses into an asset instead of applying a marker 12. The variation in material thickness can be easily measured in many ways, such as visually or with radiography, and can be interpreted as a binary pattern.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system comprising:
   a fabrication machine configured to fabricate, from a raw substrate separate and independent from an object, a marker separate and independent from the object, the marker having identifying information identifying the object, the marker being composed of a radiopaque material and having:
   a bottom surface configured to be placed adjacent to the object; and
   a top surface; and
   a controller having a processor operating a predetermined encoding process, with the processor configured to control the machine to fabricate the marker with a plurality of recesses in at least the top surface,
   wherein the plurality of recesses encode the identifying information.

2. The system of claim 1, wherein the fabrication machine is a computer numerical control (CNC) machine.

3. The system of claim 1, wherein the fabrication machine includes a drill for drilling the plurality of recesses in the raw substrate to fabricate the marker.

4. The system of claim 1, wherein the fabrication machine includes a boring tool for boring the plurality of recesses in the raw substrate to fabricate the marker.

5. A method comprising:
   providing a raw substrate separate and independent from an object;
   receiving an alphanumeric identifier of the object;
   generating a unique binary identifier corresponding to the object from the alphanumeric identifier; and
   controlling a fabrication machine configured to fabricate, from the raw substrate, a marker separate and independent from the object, wherein the marker encodes the binary identifier corresponding to the object within a pattern defined by a plurality of recesses, wherein the marker is configured to be placed adjacent to the object.

6. The method of claim 5, wherein the object is a weld joint of a pipe.

7. The method of claim 5, wherein the fabrication machine is a computer numerical control (CNC) machine.

8. The method of claim 5, wherein the marker is fabricated from the raw substrate composed of a radiopaque material, wherein the fabricated marker includes:
   a bottom surface configured to be placed adjacent to the object; and
   a top surface, and
   wherein the controlling of the fabrication machine includes fabricating the marker with a plurality of recesses in at least the top surface, with the plurality of recesses configured in the pattern to encode the alphanumeric identifier using the unique binary identifier.

9. The method of claim 5, further comprising:
   fastening the fabricated marker adjacent to the object.

10. The method of claim 9, wherein the fastening includes:
    securing the fabricated marker adjacent to the object using adhesive.

11. The method of claim 9, wherein the binary identifier identifies the object adjacent to the fabricated marker.

* * * * *